United States Patent [19]

Dennis et al.

[11] 4,100,228
[45] Jul. 11, 1978

[54] TRANSPARENT IMPACT STYRENE POLYMER STRUCTURE

[75] Inventors: Kent S. Dennis; Charles E. Lyons; Corwin J. Bredeweg, all of Midland, Mich.

[73] Assignee: The Dow Chemical Company, Midland, Mich.

[21] Appl. No.: 784,482

[22] Filed: Apr. 4, 1977

[51] Int. Cl.² .............................................. C08F 279/06
[52] U.S. Cl. .................................................. 260/880 R
[58] Field of Search ..................................... 260/880 R

[56] References Cited

U.S. PATENT DOCUMENTS

| | | | |
|---|---|---|---|
| 3,400,175 | 9/1968 | Finestone | 260/880 R |
| 3,660,535 | 5/1972 | Finch | 260/880 R |
| 3,868,434 | 2/1975 | Westphal | 260/880 R |
| 3,883,616 | 5/1975 | Hozumi | 260/880 R |
| 3,957,915 | 5/1976 | Spanswick | 260/880 R |
| 3,989,771 | 11/1976 | Reith | 260/880 R |
| 4,011,284 | 3/1977 | Gawne | 260/880 R |

FOREIGN PATENT DOCUMENTS 1,180,085  2/1970  United Kingdom.

*Primary Examiner*—Paul R. Michl

[57] ABSTRACT

An improved resinous structure is disclosed. The structure has a transparent resinous matrix having a light absorbance (optical density) at 640 millimicrons wavelength which is not greater than 0.07 when the structure has a thickness of 10 mils. The continuous matrix polymer is a polymer of about 65 to 95 parts by weight of styrene and 5 to 35 parts by weight of methylmethacrylate. The structure contains a discontinuous phase of a diene rubber in a proportion of about 4 to 12 parts by weight. The rubber is present in the form of particles having an average diameter not exceeding 2 microns, the particles are of a cellular nature and principally of a closed-cell configuration. The cell walls of the particles are not greater than about 0.15 microns in thickness. The rubber particles contain, occluded therein, polymer of a composition generally identical to the matrix polymer. Such resinous bodies are transparent, impact resistant and suitable for many packaging applications.

8 Claims, No Drawings

TRANSPARENT IMPACT STYRENE POLYMER STRUCTURE

Transparent impact resistant polymers or resinous compositions are highly desirable for many packaging operations. Polystyrene and polymethylmethacrylate are both resins having a highly desirable degree of transparency for many packaging applications. However, both polystyrene and polymethylmethacrylate are often found to be too brittle to provide a reliable package particularly when used as containers or as vacuum-formed oriented sheet, tubs, lids and the like. In an effort to improve the impact resistance of resins such as polystyrene, rubber has been added to the polystyrene in one fashion or the other to provide either a dispersion of solid rubber particles within a polystyrene matrix or a dispersion of rubber particles containing occluded polystyrene dispersed within a polystyrene matrix. Employing such techniques, a substantial increase in the impact resistance is obtained. However, the resultant product is usually opaque or translucent and is unsatisfactory for packaging applications which require a transparent material. Biaxial orientation of certain rubber-containing impact resistant styrene polymer films results in a product having improved transparency. However, when such articles are obtained in a heavier or thicker section, the opacity is usually too great or the impact resistance is inadequate. In an attempt to produce transparent impact resistant styrene polymers, considerable effort has been expanded in employing as a polymer matrix a copolymer of methylmethacrylate and styrene, the methylmethacrylate and styrene being employed in such a proportion that the refractive index of the reinforcing rubber and the methylmethacrylate-styrene polymer differ by an insignificant value hereby providing a resinous body which does not scatter large amounts of light and, at least to the unaided eye, in thin sections appears transparent. The resultant polymers obtained using the refractive index matching technique usually are polymers which have methylmethacrylate as a major component. Such impact resistant polymers are set forth in the following patents: British Pat. No. 1,180,085; U.S. Pat. No. 3,261,887; U.S. Pat. No. 3,300,545; U.S. Pat. No. 3,400,175 and U.S. Pat. No. 3,427,274.

It would be desirable if there were available an improved polymer structure which could be readily prepared employing a mass or bulk polymerization system, the polymer being impact-resistant, transparent, and containing styrene as the major component thereof.

It would be also desirable if there were available an improved impact resistant transparent polymer structure containing styrene as a principal component thereof and a rubber which did not require matching of the refractive index of the rubber and styrene polymer.

These benefits and other advantages in accordance with the present invention are achieved in an improved synthetic resinous structure or body, the structure comprising a continuous matrix of a polymer of about 65 to 95 parts by weight of styrene and 5 to 35 parts by weight of methylmethacrylate, the structure having a dispersed phase of a diene rubber, the diene rubber being present in a proportion of from 4 to about 12 parts by weight per hundred parts by weight of the combined weight of styrene and methylmethacrylate, the rubber being in the form of a plurality of particles dispersed throughout a styrene-methylmethacrylate polymer continuous phase, the rubber particles being of a generally cellular nature and containing occlusions of the styrene-methylmethacrylate polymer, the particles being of both monocellular and multicellular configurations, the rubber particles having a weight average particle diameter not exceeding 2 microns and the cell walls of the rubber particles having a thickness not exceeding 0.15 microns, the dimensions and configuration of the rubber particles being determined by means of an electron microscope on a sample of the polymer which has been treated with osmium tetraoxide, [K. Kato, *Polymer Engineering and Science,* 7, 38(1967)], with the further limitation that when the structure has a thickness of about 10 mils, the light absorbance, as measured using a wavelength of 640 millimicrons, is not greater than about 0.07, and the structure has a notched Izod impact value, when measured in accordance with The American Society for Testing Materials Specification D256A, of at least 0.65 foot pounds per inch of notch.

Also contemplated within the scope of the present invention is a method for the preparation of a generally transparent impact resistant polymer structure, the steps of the method comprising providing a rubbery reinforcing diene polymer which is a polymer prepared from 1,3-butadiene, isoprene or mixtures thereof, the diene rubber having an inherent viscosity in the range of 0.9–2.5 as determined at 25° C employing 0.3 gram of rubber per deciliter of toluene, the diene rubber being employed in a proportion of from about 4 to 12 parts by weight, preparing a solution of the diene rubber in a mixture of (a) styrene and methylmethacrylate, the styrene being present in a proportion from about 65 to 95 parts by weight and the methylmethacrylate being present in a proportion from about 5 to 35 parts by weight of methylmethacrylate, (b) from about 0.01 to 0.5 weight percent of a bromine-containing compound selected from the group consisting of: allyl bromide, 2-(bromomethyl)-3-bromopropene, 1-bromo-1-propene, 1-bromo-1-butene, 1-bromo-1-pentene, 3,3-dibromo-1-propene, 3-bromo-1-pentene, 3,4-dibromo-1-butene, 1-bromo-1-hexene, 2-(dibromomethyl)-1-pentene, 2-(bromomethyl)-1-butene, 2-(bromomethyl)-1-pentene, 2-(dibromomethyl)-1-pentene, 2-(bromomethyl)-1-hexene, 3-bromo-1-hexene, 2-(dibromomethyl)-1-hexene, 3-bromocyclohexene, and 3-bromocyclopentene, and mixtures of such compounds, heating the mixture with agitation to a temperature to initiate free radical polymerization, maintaining agitation until at least about 30 weight percent of the combined weight of the styrene and methylmethacrylate is converted to polymer and subsequently polymerizing the mixture until about 70 to 95 percent conversion of monomer to polymer to thereby provide in an improved synthetic resinous structure or body, the structure comprising a continuous matrix of a polymer of about 65 to 95 parts by weight of styrene and 5 to 35 parts by weight of methylmethacrylate, the structure having a dispersed phase of a diene rubber, the diene rubber being present in a proportion of from 4 to about 12 parts by weight per hundred parts by weight of the combined weight of styrene and methylmethacrylate, the rubber being in the form of a plurality of particles dispersed throughout a styrene-methylmethacrylate polymer continuous phase, the rubber particles being of a generally cellular nature and containing occlusions of the styrene-methylmethacrylate polymer, the particles being of both monocellular and multicellular configurations, the rubber particles having a weight average particle diameter not exceeding 2 microns and the cell walls of the rubber particles having a thickness not exceeding 0.15 microns, the dimensions and configuration of the rubber particles being determined by means of an electron microscope on a sample of the polymer which has been treated with osmium tetraoxide, [K. Kato, *Polymer Engineering and Science*, 7, 38(1967)], with the further limitation that when the structure has a thickness of about 10 mils, the light absorbance, as measured using a wavelength of 640 millimicrons, is not greater than about 0.07, and the structure has a notched Izod impact value, when measured in accordance with The American Society for Testing Materials Specification D256A, of at least 0.65 foot pounds per inch of notch.

In the preparation of polymers in accordance with the present invention styrene and methylmethacrylate of commercial purity are found to be satisfactory. Similarly the bromine-containing compounds hereinbefore set forth of commercial purity are also satisfactory as are mixtures thereof. If desired, in the polymerization of styrene polymers of the present invention a diluent may be employed. Usually it is desirable to employ a diluent or solvent which may be present in a quantity of up to 20 parts by weight per 100 parts styrene and methylmethacrylate. The diluent generally aids in the polymerization by increasing heat transfer, by reducing the viscosity of the polymerizing mixture and in easing the problem of handling viscous syrups. Suitable diluents are hydrocarbons that are generally non-reactive under the polymerization conditions and are a solvent for the monomers and the polymer produced. Such diluents include substituted aromatic compounds such as ethylbenzene and xylenes.

It is desirable in the preparation of polymers in accordance with the present invention to provide a free radical polymerization initiator; although, if desired, a satisfactory product can be obtained using thermal initiation. The preferred free radical initiators are those which decompose to produce alkoxy radical fragments or aryloxyradical fragments. The following compounds are preferred initiators; t-butyl perbenzoate, t-butyl peracetate and 1,1-di(tertiary butyl peroxy)cyclohexane. Also useful in the preparation of polymers in accordance with the invention are: $\alpha,\alpha'$bis(t-butyl peroxy)-diisopropylbenzene, di-t-amyl peroxide, di-t-butylperoxide, dicumyl peroxide, t-butyl peroxy-3,3,5-trimethyl hexanoate, 2,5-dimethyl-2,5-bis(benzoyl peroxy)hexane, di-t-butyl diperoxy phthalate, t-butyl peroxy crotonate, t-butyl peroctoate, benzoyl peroxide, 2,4-dichlorobenzoyl peroxide, p-chlorobenzoyl peroxide, 5-butyl-peroxy isopropyl carbonate, 4-(t-butyl)-1,1-bis(t-butyl peroxy) cyclohexane, 1,1-bis(t-butyl peroxy)-3,3,5-trimethyl cyclohexane, t-butyl hydroperoxide, cumene hydroperoxide, 1,1,3,3-tetramethyl butyl hydroperoxide, lauroyl peroxide, decanoyl peroxide, methyl ethyl ketone peroxides, cyclohexanone peroxides, $\alpha,\alpha'$-azo-diisobutyronitrile and the like. Generally such compounds are employed in amounts from about 0.01 to 0.5 weight percent based on the weight of the monomeric material.

Rubbers useful for the preparation of polymers in accordance with the present invention are rubbers which are soluble in a 75:25 by weight styrene-methylmethacrylate mixture in an amount of 15 parts by weight of rubber per 100 parts of styrene and methylmethacrylate at a temperature of 80° C, the rubber consisting essentially of the polymerization product of butadiene, isoprene, and copolymers thereof containing up to 30 weight percent styrene or mixtures thereof. Many such rubbers are well known and commercially available. Oftentimes, one or more such rubbery polymers may be employed in the polymerization, however, the total amount of the rubber should be in the proportion of from about 4 to 12 parts by weight of rubbery polymer per 100 parts by weight of styrene and methylmethacrylate. Generally, in the preparation of polymers in accordance with the present invention employing the foregoing ingredients, it is desirable to combine the rubbery polymer and styrene with a diluent such as ethylbenzene. Any diluent may be employed which is generally non-reactive with the polymerizing components and the product of the polymerization under conditions of polymerization and devolatilization of the reaction mixture. The diluent must also be a solvent for the styrene-methylmethacrylate polymer formed during the polymerization. In dissolving the rubber in styrene or a styrene-methylmethacrylate mixture generally it is desirable to include with the styrene a major portion of the solvent or diluent which is to be used in order to obtain the solution as rapidly as possible. Although the rubber may be dissolved in a mixture of the styrene-methylmethacrylate diluent, it is generally desirable to add the methylmethacrylate after the rubber has dissolved in the styrene or styrene-diluent mixture. Generally, a small portion of the diluent is employed to dissolve the initiator and the bromine-containing compound or grafting agent such as allyl bromide, 2-bromomethyl-3-bromopropene or mixtures thereof. The reaction mixture is then raised to appropriate polymerization initiating temperature such as a temperature between about 60° C and 100° C at which time the solution of the initiator and bromine-containing compound is added to the reaction mixture with agitation; optionally the initiator may be added prior to, or during heating. The temperature of the reaction mixture is then raised to a temperature within the range of 80° to 130° C and maintained in this range for a period of about 3 to 10 hours with agitation, a nitrogen or other inert atmosphere being maintained within the reactor. When the solids content of the reaction mixture reaches from about 30 to 50 percent conversion, agitation may be discontinued if desired and the temperature of the reaction mixture raised over a period of 2 to 5 hours to a temperature within the range of 170° to 190° C. When polymerization, from a practical standpoint, is complete, generally in a range from about 80 to 95 percent conversion of the monomers to polymer solids, the reaction mixture is devolatilized usually at a temperature from about 200° to 240° C, beneficially under vacuum of from about 0.1 to 50 millimeters of mercury.

The polymer may be prepared by either batch or continuous-process polymerization. The following examples serve to illustrate the invention but should not be construed as limiting thereof.

EXAMPLES

A plurality of polymerization runs was carried out employing the following procedure. A 2-liter jacketed reactor having an agitator was employed in all polymerizations. The agitator was a rotatable hollow shaft having two helical vanes mounted external to the hollow shaft. The vanes had a clearance of about 1 mil. from the inner wall of the reaction vessel. When the agitator was rotated, the helical vanes forced the reaction mixture downwardly along the shaft and adjacent walls of the reaction vessel. (More conventional agitators with horizontal crossbars can also be used satisfactorily). The monomer mixtures plus 95% of the diluent employed and dissolved rubber were added to the reactor. The reactor was nitrogen-purged and heated to a temperature of about 90° C with stirring. The polymerization initiator and bromine-containing compound dissolved in the remaining 5% of diluent was then added. The agitator was set at a speed of about 20 rpm and the temperature of the reaction mixture raised to about 105° C generally cycling from 100° to 110° C for a period of 4 to 5 hours. During this period, nitrogen was maintained over the reaction mixture. Periodically, samples of the reaction mixture were removed from a sampling connection on the bottom of the reaction vessel and when the reaction mixture contained between about 38 and 42 percent solids, the mixture was transferred to tubes and polymerization completed in a heating block programmed to raise the temperature of the reaction mixture from about 100° to 175° C over a period of 5 hours. At the end of that time, the solids content of the reaction mixture was from about 78 to 84 percent. The mixture was then forced from the tubes with nitrogen pressure and devolatilized in a vacuum oven maintained at a temperature of about 210° C and under a pressure of about 1 millimeter of mercury for a period of about 1½ hours. At the end of the 1½ hours of devolatilization, the product was removed from the oven and maintained in an inert atmosphere for a few minutes to minimize surface yellowing. The cooled slab was then granulated and portions molded into test plaques for light absorbance testing. Light absorbance was measured using a Beckman Model B spectrophotometer wherein the film sample was placed approximately 9 centimeters from the center of the photocell light detector. The wavelength employed was 640 millimicrons and the reading obtained was corrected to 10 mils thickness. Notched Izod impact tests were conducted employing procedure ASTM D-256A.

The rubbers employed were:

Diene 35: a polybutadiene rubber of 2.04 deciliters per gram inherent viscosity at 0.3 gram per deciliter in toluene.

Diene 55: a polybutadiene rubber of 2.30 deciliters per gram inherent viscosity at 0.3 gram per deciliter in toluene.

Taktene: a polybutadiene rubber whose molecular structure is approximately 98% cis-1,4 configuration, as compared to approximately 35% cis-1,4 and 55% trans-1,4 in Diene-35 and -55. (The remaining is vinyl-1,2).

Stereon S-700: approximately 80 parts by weight butadiene/20 parts by weight styrene rubber in which 18% styrene is randomly present and 2% styrene is as block.

The results are set forth in the following Table I:

TABLE I

| Run No. | Composition(1) | Rubber | Percent TBPB(2) | Percent Brominated Compound | Absor. (10 mls at 640 mμ) | N. Izod imp. (ft-lbs/-in-notch) | Tensile Yield (psi) | Tensile Rupture (psi) | % elg(3) | Vicat H.D. (° F) |
|---|---|---|---|---|---|---|---|---|---|---|
| 1 | 68 S/ 25 MMA/ 7 R | Diene-55 | 0.15 | none | 0.09 | 1.17 | 4014 | 4738 | 24.2 | 214 |
| 2 | 68 S/ 25 MMA/ 7 R | Diene-55 | 0.15 | 0.10 a.b. (4) | 0.06 | 0.99 | 3733 | 4009 | 28.6 | 210 |
| 3 | 68 S/ 25 MMA/ 7 R | Diene-55 | 0.15 | 0.15 " | 0.06 | 1.06 | 3419 | 4169 | 33.1 | 210 |
| 4 | 68 S/ 25 MMA/ 7 R | Diene-55 | 0.15 | 0.20 " | 0.05 | 1.21 | 4377 | 3992 | 14.1 | 217 |
| 5 | 68 S/ 25 MMA/ 7 R | Diene-55 | 0.15 | 0.25 " | 0.05 | 1.10 | 3387 | 4127 | 15.0 | 217 |
| 6 | 69 S/ 25 MMA/ 6 R | Diene-55 | 0.15 | 0.20 " | 0.05 | 1.05 | 4611 | 4654 | 11.5 | 217 |
| 7 | 69 S/ 25 MMA/ 6 R | Diene-35 | 0.15 | 0.20 " | 0.05 | 1.20 | 4738 | 4433 | 6.5 | 219 |
| 8 | 67 S/ 25 MMA/ 8 R | Diene-35 | 0.15 | 0.20 a.b.(4) | 0.05 | 1.08 | 4182 | 3955 | 5.2 | 225 |
| 9 | 68 S/ 25 MMA/ 7 R | Taktene | 0.15 | 0.20 " | 0.05 | 1.65 | 4446 | 4056 | 10.1 | 219 |
| 10 | 68 S/ 25 MMA/ 7 R | Diene-55 | 0.05 | 0.20 " | 0.07 | 1.18 | 3443 | 4104 | 32.8 | 216 |
| 11 | 88 S/ 5 MMA/ 7 R | Diene-55 | 0.15 | 0.20 " | 0.07 | 1.01 | 3865 | 3914 | 13.7 | 223 |
| 12 | 83 S/ 10 MMA/ 7 R | Diene-55 | 0.15 | 0.20 " | 0.06 | 1.18 | 3355 | 3959 | 10.4 | 225 |
| 13 | 68 S/ 25 MMA/ 7 R | Diene-55 | 0.15 | 0.40 1-bp(5) | 0.07 | 1.18 | 3932 | 4292 | 20.0 | 219 |
| 14 | 68 S/ 25 MMA/ 7 R | Diene-55 | 0.15 | 0.04 dib(6) | 0.06 | 1.21 | 4047 | 4621 | 27.7 | 212 |
| 15 | 75 S/ 15 MMA/ 8 R | 7% S-700 + 1% Diene-55 | 0.10 | none | 0.09 | 1.15 | 4520 | 4520 | 3.2 | 221 |
| 16 | 67 S/ 25 MMA/ 8 R | 7% S-700 + 1% Diene-55 | 0.25 | 0.40 1-bp | 0.06 | 1.01 | 5468 | 5169 | 5.3 | 219 |
| 17 | 77 S/ 15 MMA/ 8 R | 7% S-700 + 1% Diene-55 | 0.10 | 0.10 a.b. | 0.05 | 0.95 | 5053 | 4573 | 6.2 | 217 |

TABLE I-continued

| Run No. | Composition(1) | Rubber | Percent TBPB(2) | Percent Brominated Compound | Absor. (10 mls at 640 mμ) | N. Izod imp. (ft-lbs/-in-notch) | Tensile Yield (psi) | Tensile Rupture (psi) | % elg(3) | Vicat H.D. (° F) |
|---|---|---|---|---|---|---|---|---|---|---|
| 18 | 67 S/ 25 MMA/ 8 R | Stereon S-700 | 0.13 TBPA(7) | 0.15 a.b. | 0.04 | 1.23 | 4012 | 4338 | 23.2 | 207 |
| 19 | 67 S/ 25 MMA/ 8 R | 7% S-700 + 1% Diene 55 | 0.15 TBC(8) | 0.04 dib(6) | 0.04 | 1.48 | 3693 | 4399 | 32.7 | 207 |
| 20 | 67 S/ 25 MMA/ 8 R | 7% S-700 + 1% Diene 55 | 0.15 TBC | 0.15 a.b. | 0.04 | 1.70 | 4116 | 4041 | 29.8 | 212 |

(1)Numbers indicate weight percent of styrene, methylmethacrylate, and rubber
(2)TBPB = tertiary-butyl perbenzoate
(3)% elg = percent elongation at rupture
(4)a.b. = allyl bromide
(5)1-bp = 1-bromopropene
(6)dib = 2-bromomethyl-3-bromopropene
(7)TBPA = t-butyl peracetate
(8)TBC = 4-(t-butyl)-1,1-bis(t-butylperoxy)cyclohexane Resins of the foregoing examples within the scope of the present invention, had weight average particle diameters of less than 2 microns and cell walls not greater than about 0.15 microns in thickness and a majority of the particles showed occlusions of polystyrene. Some particles were monocellular while others were multicellular.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a generally transparent impact resistant polymer structure, the steps of the method comprising providing a rubbery reinforcing diene polymer which is a polymer prepared from 1,3-butadiene, isoprene or mixtures thereof, the diene rubber having an inherent viscosity in the range of 0.9–2.5 as determined at 25° C employing 0.3 gram of rubber per deciliter of toluene, the diene rubber being employed in a proportion of from about 4 to 12 parts by weight, preparing a solution of the diene rubber in a mixture of (a) styrene and methylmethacrylate, the styrene being present in a proportion from about 65 to 95 parts by weight and the methylmethacrylate being present in a proportion from about 5 to 35 parts by weight of methylmethacrylate, (b) from about 0.01 to 0.5 weight percent of a bromine-containing compound selected from the group consisting of: allyl bromide, 2-(bromomethyl)-3-bromopropene, 3,3-dibromo-1-propene, 1-bromo-1-propene, 1-bromo-1-butene, 1-bromo-1-pentene 1-bromo-1-hexene 3-bromo-1-pentene, 3,4-dibromo-1-butene, 2-(dibromomethyl)-1-pentene, 2-(bromomethyl)-1-butene, 2-(bromomethyl)-1-pentene, 2-(dibormomethyl)-1-pentene, 2-(bromomethyl)-1-hexane, 3-bromo-1-hexene, 2-(dibromomethyl)-1-hexene, 3-bromocyclohexene, and 3-bromocyclopentene, and mixtures of such compounds, heating the mixture with agitation to a temperature to initiate free radical polymerization, maintaining agitation until at least about 30 weight percent of the combined weight of the styrene and methylmethacrylate is converted to polymer and subsequently polymerizing the mixture until about 70 to 95 percent conversion of monomer to polymer to thereby provide in an improved synthetic resinous structure or body, the structure comprising a continuous matrix of a polymer of about 65 to 95 parts by weight of styrene and 5 to 35 parts by weight of methylmethacrylate, the structure having a dispersed phase of a diene rubber, the diene rubber being present in a proportion of from 4 to about 12 parts by weight per hundred parts by weight of the combined weight of styrene and methylmethacrylate, the rubber being in the form of a plurality of particles dispersed throughout a styrene-methylmethacrylate polymer continuous phase, the rubber particles being of a generally cellular nature and containing occulusions of the styrene-methylmethacrylate polymer, the particles being of both monocellular and multicellular configurations, the rubber particles having a weight average particle diameter not exceeding 2 microns and the cell walls of the rubber particles having a thickness not exceeding 0.15 microns, the dimensions and configuration of the rubber particles being determined by means of an electron microscope on a sample of the polymer which has been treated with osmium tetraoxide, [K. Kato, Polymer Engineering and Science, 7, 38(1967)], with the further limitation that when the structure has a thickness of about 10 mils, the light absorbance, as measured using a wavelength of 640 millimicrons, is not greater than about 0.07, and the structure has a notched Izod impact value, when measured in accordance with The American Society for Testing Materials Specification D256A, of at least 0.65 foot pounds per inch of notch.

2. The method of claim 1 wherein the polymerization is carried out in the presence of a diluent.

3. The method of claim 2 wherein the diluent is ethylbenzene.

4. The method of claim 1 wherein the solution is agitated until from about 30 to 50 percent of monomeric material is converted to polymer.

5. The method of claim 1 wherein the bromine-containing compound is allyl bromide.

6. The method of claim 1 wherein the bromine-containing compound is 2-bromomethyl-3-bromopropene.

7. The method of claim 1 wherein the bromine-containing compound is 1-bromopropene.

8. The method of claim 1 including the step of employing a free radical initiating compound to initiate polymerization.

* * * * *

UNITED STATES PATENT AND TRADEMARK OFFICE
CERTIFICATE OF CORRECTION

PATENT NO. : 4,100,228

DATED : July 11, 1978

INVENTOR(S) : Kent S. Dennis; Charles E. Lyons; Corwin J. Bredeweg, all of Midland, Mich.

It is certified that error appears in the above-identified patent and that said Letters Patent are hereby corrected as shown below:

Column 1, line 30 delete "expanded" and insert --expended--.

Column 7, line 61 delete "ane" and insert --ene--.

Column 8, line 34 delete "occulusions" and insert --occlusions--.

Signed and Sealed this

Twentieth Day of February 1979

[SEAL]

Attest:

RUTH C. MASON
Attesting Officer

DONALD W. BANNER
Commissioner of Patents and Trademarks